United States Patent
Mallison et al.

(10) Patent No.: US 9,026,416 B2
(45) Date of Patent: *May 5, 2015

(54) SYSTEM AND METHOD OF GRID GENERATION FOR DISCRETE FRACTURE MODELING

(75) Inventors: Bradley Thomas Mallison, Mountain View, CA (US); Mun-Hong Hui, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/630,734

(22) Filed: Dec. 3, 2009

(65) Prior Publication Data

US 2010/0138202 A1    Jun. 3, 2010

Related U.S. Application Data

(60) Provisional application No. 61/119,604, filed on Dec. 3, 2008.

(51) Int. Cl.
| | | |
|---|---|---|
| G06G 7/50 | (2006.01) | |
| G06G 7/58 | (2006.01) | |
| E21B 43/00 | (2006.01) | |
| G01V 1/18 | (2006.01) | |

(Continued)

(52) U.S. Cl.
CPC . *E21B 43/00* (2013.01); *G01V 1/18* (2013.01); *G01V 11/00* (2013.01); *G01V 2210/66* (2013.01); *G06F 17/5018* (2013.01); *G06F 2217/16* (2013.01)

(58) Field of Classification Search
CPC ..... G01V 11/00; G01V 1/18; G01V 2210/66; G06F 17/5018; G06F 2217/16; E21B 43/00
USPC .......................................................... 703/10
See application file for complete search history.

(56) References Cited

U.S. PATENT DOCUMENTS

| | | |
|---|---|---|
| 5,740,342 A | 4/1998 | Kocberber |
| 6,106,561 A | 8/2000 | Farmer |
| 6,266,062 B1 | 7/2001 | Rivara |

(Continued)

FOREIGN PATENT DOCUMENTS

CN        102750725 A        10/2012

OTHER PUBLICATIONS

Karimi-Fard et al. (Generation of Coarse-scale continuum flow models from detailed fracture characterization, 2006).*

(Continued)

*Primary Examiner* — Kamini S Shah
*Assistant Examiner* — Andre Pierre Louis

(57) ABSTRACT

Computer-implemented systems and methods are provided for generating accurate grids that can be used for simulation of highly complex subsurface reservoirs, such as fractured subsurface reservoirs. A representation of a fractured subsurface reservoir and an explicit discrete fracture represented within the fractured subsurface reservoir are provided. The representation of the fractured subsurface reservoir is decomposed into polyhedral cells. Interfaces between the polyhedral cells are selected to approximate the discrete fracture explicitly represented within the fractured subsurface reservoir. The selected interfaces are used to produce a grid that can be used for constructing a simulation model of the fractured subsurface reservoir.

27 Claims, 11 Drawing Sheets

(51) Int. Cl.
*G01V 11/00* (2006.01)
*G06F 17/50* (2006.01)

(56) References Cited

U.S. PATENT DOCUMENTS

| | | | |
|---|---|---|---|
| 6,490,526 | B2 | 12/2002 | Matteucci et al. |
| 6,826,520 | B1 | 11/2004 | Khan |
| 6,842,725 | B1 | 1/2005 | Sarda |
| 6,907,392 | B2* | 6/2005 | Bennis et al. ............... 703/10 |
| 6,922,662 | B2 | 7/2005 | Manceau et al. |
| 7,047,165 | B2 | 5/2006 | Balaven et al. |
| 7,260,508 | B2 | 8/2007 | Lim et al. |
| 7,369,973 | B2 | 5/2008 | Kennon et al. |
| 7,451,066 | B2 | 11/2008 | Edwards et al. |
| 7,561,991 | B2* | 7/2009 | Matsunaga et al. ........... 703/2 |
| 7,565,278 | B2 | 7/2009 | Li et al. |
| 7,634,395 | B2 | 12/2009 | Flandrin et al. |
| 8,274,859 | B2 | 9/2012 | Maucec et al. |
| 2002/0038201 | A1 | 3/2002 | Balaven et al. |
| 2003/0216898 | A1 | 11/2003 | Basquet et al. |
| 2005/0273303 | A1 | 12/2005 | Flandrin et al. |
| 2007/0073527 | A1* | 3/2007 | Flandrin et al. ............. 703/10 |
| 2008/0091396 | A1 | 4/2008 | Kennon et al. |
| 2008/0133186 | A1 | 6/2008 | Li et al. |
| 2009/0150124 | A1 | 6/2009 | Wilt et al. |
| 2010/0138196 | A1 | 6/2010 | Hui et al. |
| 2011/0082676 | A1* | 4/2011 | Bratvedt et al. ............. 703/10 |

OTHER PUBLICATIONS

Clemens Helf (A polygonal/polyhedral grid data structure for integrated grid generation and flow simulation, (13 pages), dated Feb. 2001).*
International Preliminary Report of Patentability, PCT/US2009/066632, Jun. 16, 2011.
Karimi-Fard et al., "An efficient discrete-fracture model applicable for general-purpose reservoir simulators", Jun. 2004, SPE Journal, pp. 227-236.
International Search Report and Written Opinion for International Application No. PCT/US2009/066632 dated Jun. 25, 2010, 6 pages.
Teran, J., Molino, N. and Fedkiw, R., Bridson, R., "Adaptive physics based tetrahedral mesh generation using level sets," Engineering with Computers vol. 21, Issue 1 (Jul. 2005), pp. 2-18.
Hui, Mun-Hong, et al.; "Development and Application of New Computational Procedures for Modeling Miscible Gas Injection in Fractured Reservoirs"; SPE 109686, 2007, pp. 1-11.
Hui, Mun-Hong, et al.; "Realistic Modeling of Fracture Networks in a Giant Carbonate Reservoir"; IPTC 11386, 2007, pp. 11.
Lunati, Ivan, et al.; "Multiscale Finite-Volume Method for Density-Driven Flow in Porous Media;" Comput. Geosci., 2008, vol. 12, pp. 337-350.
Mäkel, G.H.; "The Modelling of Fractured Reservoirs: Constraints and Potential for Fracture Network Geometry and Hydraulics Analysis;" Geological Society, London, Special Publications 2007, vol. 292, pp. 375-403.
Mallison, Brad, et al.; "Practical Gridding Algorithms for Discrete Fracture Modeling Workflows"; ECMOR XII—12*th* European Conference on the Mathematics of Oil Recovery, Sep. 2010, Oxford, UK.
Mallison, Brad, et al.; "Practical Gridding Algorithms for Discrete Fracture Modeling Workflows"; PowerPoint Presentation, Sep. 8, 2010.
Mallison, Brad, et al.; "Simple Grid Generation Algorithms for Discrete Fracture Modeling Workflows"; PowerPoint Presentation, Mar. 23, 2011.
Matthäi, S.K., et al.; "Control-Volume Finite-Element Two-Phase Flow Experiments with Fractured Rock Represented by Unstructured 3D Hybrid Meshes"; SPE 93341, 2005, pp. 1-21.
Moinfar, Ali, et al.; "Comparison of Discrete-Fracture and Dual-Permeability Models for Multiphase Flow in Naturally Fractured Reservoirs"; SPE 142295, 2011, pp. 1-17.
Nikravesh, Masoud; "Soft Computing-based Computational Intelligent for Reservoir Characterization"; Expert Systems with Applications, 2004, vol. 26, pp. 19-38.
Persson, Per-Olof, et al.; "A Simple Mesh Generator in MATLAB"; Society for Industrial and Applied Mathematics, 2004, vol. 46, No. 2, pp. 329-345.
Shewchuk, Jonathan Richard; "Constrained Delaunay Tetrahedralizations and Provably Good Boundary Recovery"; University of California Berkeley, Berkeley, CA, 2002.
Shewchuk, Jonathan Richard; "Triangle: Engineering a 2D Quality Mesh Generator and Delaunay Triangulator"; 1996, pp. 1-10.
Si, Hang; "TetGen a Quality Tetrahedral Mesh Generator and Three-Dimensional Delaunay Triangulator"; Version 1.3, User's Manual, Jun. 20, 2005, pp. 1-61.
Teran, J., et al.; "Adaptive Physics Based on Tetrahedral Mesh Generation Using Level Sets"; Engineering with Computers, 2005, vol. 21, pp. 2-18, Special Issue.
Warren, J.E., et al.; "The Behavior of Naturally Fractured Reservoirs", SPE 426, Sep. 1963, pp. 245-255.
Non-Final Office Action dated Sep. 7, 2012, U.S. Appl. No. 12/630,709, filed Dec. 3, 2009, Conf. No. 1259, pp. 1-15.
Final Office Action dated Apr. 9, 2013, U.S. Appl. No. 12/630,709, filed Dec. 3, 2009, Conf. No. 1259, pp. 1-16.
Non-Final Office Action dated Sep. 27, 2013, U.S. Appl. No. 12/630,709, filed Dec. 3, 2009, Conf. No. 1259, pp. 1-16.
Accary, Gilbert, et al.; "A 3D Finite Volume Method for the Prediction of a Supercritical Fluid Buoyant Flow in a Differentially Heated Cavity"; Computers & Fluids, 2006, vol. 35, pp. 1316-1331.
Cao, H., et al.; "Parallel Scalable Unstructured CPR-Type Linear Solver for Reservoir Simulation"; SPE 96809, Oct. 2005, pp. 1-8.
Geiger, S., et al.; "Black-Oil Simulations for Three-Component, Three-Phase Flow in Fractured Porous Media"; SPE Journal, Jun. 2009, pp. 338-354.
Holm, Randi, et al.; "Meshing of Domains with Complex Internal Geometrics"; Numerical Linear Algebra with Applications, 2006, vol. 13, pp. 717-731.
Hoteit, et al.; "Multicomponent Fluid Flow by Discontinuous Galerkin and Mixed Methods in Unfractured and Fractured Media"; Water Resources Research, 2005, vol. 41, W11412, pp. 1-15.
Hui, Mun-Hong, et al.; "An Innovative Workflow to Model Fractures in a Giant Carbonate Reservoir"; IPTC 12572, Dec. 2008, pp. 1-15.
HUI, Mun-Hong, et al.; "Realistic Modeling of Fracture Networks in a Giant Carbonate Reservoir"; IPTC 11386, Dec. 2007, pp. 1-11.
Karimi-Fard, M., et al.; "An Efficient Discrete Fracture Model Applicable for General-Purpose Reservoir Simulators;" SPE 79699, Feb. 2003, pp. 1-11.
Karimi-Fard, M., et al.; "An Efficient Discrete Fracture Model Applicable for General-Purpose Reservoir Simulators;" SPE 88812 (revised for publication from paper SPE 79699), Jun. 2004, pp. 227-236.
Karimi-Fard, M., et al.; "Generation of Course-Scale Continuum Flow Models from Detailed Fracture Characterizations"; Water Resources Research, 2006, vol. 42, W10423; pp. 1-13.
Kazemi, H., et al.; "Numerical Simulation of Water-Oil Flow in Naturally Fractured Reservoirs"; SPE 5719, Dec. 1976, pp. 317-326.
Li, Liyong, et al.; "Efficient Field-Scale Simulation of Black Oil in a Naturally Fractured Reservoir Through Discrete Fracture Networks and Homogenized Media"; SPE Reservoir Evaluation & Engineering, Aug. 2008, pp. 750-758.
Lim, Kok-Thye, et al.; "A Next-Generation Reservoir Simulator as an Enabling Technology for a Complex Discrete Fracture Modeling Workflow"; SPE 124980, 2009, pp. 1-8.
Final Office Action dated May 20, 2014, U.S. Appl. No. 12/630,709, filed Dec. 3, 2009, Conf. No. 1259, pp. 1-15.

* cited by examiner

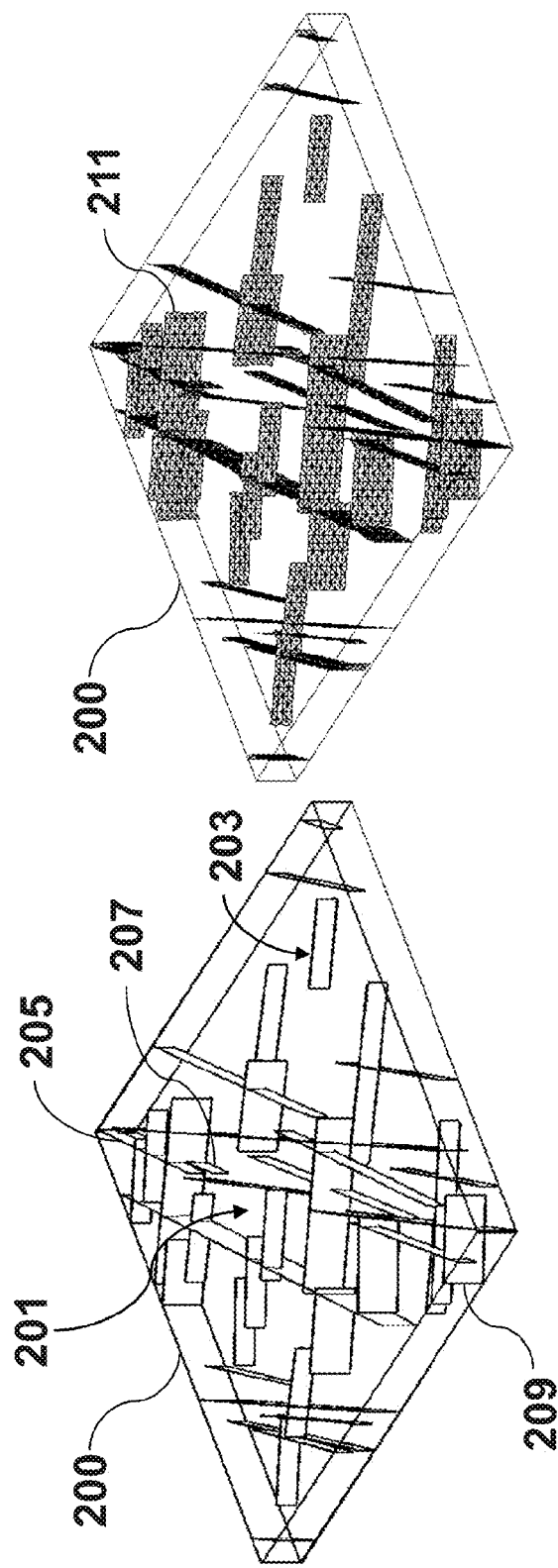

SYSTEM AND METHOD OF GRID GENERATION FOR DISCRETE FRACTURE MODELING

CROSS-REFERENCE TO RELATED APPLICATION

The present application for patent claims the benefit of U.S. Provisional application for patent bearing Ser. No. 61/119,604, filed on Dec. 3, 2008, which the entirety of the application is incorporated herein by reference.

FIELD OF THE INVENTION

The present invention generally relates to a system and method for generating a grid that can be used to construct a simulation model of a subsurface reservoir, and more particularly, to a system and method for generating a grid that can be used to construct a simulation model of a highly complex subsurface reservoir such as a fractured subsurface reservoir.

BACKGROUND OF THE INVENTION

The field of hydrocarbon production is directed to retrieving hydrocarbons that are trapped in subsurface reservoirs. Typically, these reservoirs are comprised of parallel layers of rock and fluid material each characterized by different sedimentological and fluid properties. Hydrocarbons accumulate below or between non-porous or lower permeability rock layers, forming reservoirs. These hydrocarbons can be recovered by drilling wells into the reservoirs. Accordingly, hydrocarbons are able to flow from the reservoirs into the well and up to the surface. The production rate at which hydrocarbons flow into the well is vital to the petroleum industry and as a result, a large amount of effort has been dedicated to developing techniques in order to better predict fluid flow and geomechanical characteristics of subsurface reservoirs. One of these techniques relates to gridding of a reservoir, which will be discussed later in more detail herein.

Highly complex geological subsurface reservoirs, such as reservoirs having a network of fractures, present unique and specialized challenges with regards to reservoir simulation. Subsurface reservoirs with a network of fractures typically have a low permeability rock matrix, making it difficult for hydrocarbons to pass through the formation. Fractures can be described as open cracks or voids within the formation and can either be naturally occurring or artificially generated from a wellbore. The presence of fractures, can therefore play an important role in allowing fluids to flow through the formation to reach a well. For example, hydrocarbon production rates from a well tend to be very different depending on whether the well is intersected by a large fracture. Sometimes fluids such as water, chemicals, gas, or a combination thereof, are injected into the reservoir to help increase hydrocarbon flow to the production well. In situations in which a fracture provides for direct connectivity between a production well and a fluid injection well, the injected fluids can flow through the fracture and bypass the majority of hydrocarbons within the formation that the injected fluids were supposed to help produce. Therefore, it is desirable to characterize the extent and orientation of fractures in hydrocarbon reservoirs to properly forecast geomechanical and fluid flow characteristics through the subsurface formation. In order to compute these characteristics, one must first apply gridding techniques.

Reservoir gridding techniques can be described as the process of decomposing a 3D reservoir volume into a plurality of smaller and simpler 3D volumes, which are typically convex 3D volumes. Accordingly, these techniques break a continuous simulation domain into discrete counterparts that can subsequently be used to construct a simulation model by discretizing the governing equations describing fluid flow, heat transfer, geomechanics, or a combination thereof. Within the reservoir simulation community, the discrete volumes are typically referred to as cells, finite volumes, control volumes, or finite elements depending on the discretization and simulation techniques being utilized.

For fractured subsurface reservoirs, gridding poses a unique challenge due to the geometric complexity and stochastic nature of the network of fractures. For instance, gridding strategies for conventional reservoir simulations are typically not designed to handle a large number of internal geometric features, such as fractures. Many gridding strategies are only suitable for geometries that are well connected and do not contain cracks or overlaps, which are often referred to as "water-tight" geometries. For example, these gridding strategies typically pre-compute the intersections of all geometric features. Others gridding strategies are unable to achieve good grid quality while capturing certain geometric intricacies, such as one fracture slightly penetrating the plane of another fracture, two fractures being close to one another without intersecting, or two fractures intersecting with a small dihedral angle. In general, grids containing internal features must balance the opposing goals of accurately approximating the features and maintaining good quality. If reservoir gridding techniques are not able to accommodate these fine-details while maintaining good grid quality, simulation of the model can result in reduced accuracy, increased run times, convergence problems, or a combination thereof.

The prior art has attempted to improve grid quality by preprocessing fracture sets to remove the most problematic configurations. However, one skilled in the art will recognize that this is not straightforward as removal of one problem often creates another. In addition, the implementation of these past attempts is nontrivial due to considerations of floating-point arithmetic in calculating fracture intersections.

SUMMARY OF THE INVENTION

According to an aspect of the present invention, a method is disclosed for generating a grid that can be used to construct a simulation model of a fractured subsurface reservoir. The method includes providing a representation of a fractured subsurface reservoir and a fracture represented within the fractured subsurface reservoir. A grid having a plurality of polyhedral cells defining cell-to-cell interfaces at the boundaries of the polyhedral cells is constructed. Interfaces adjacent to the fracture are selected to form a continuous interfaces path that approximates the geometry of the fracture. The continuous interfaces path is associated with predetermined fracture properties. A grid having the continuous interfaces path associated with the predetermined fracture properties is output for constructing a simulation model of the fractured subsurface reservoir.

In one or more embodiments, a well is provided and cell-to-cell interfaces adjacent to the well are selected to form an interfaces well region that approximates the geometry of the well. The interfaces well region is associated with predetermined well properties such that the output grid includes the interfaces well region associated with the predetermined well properties.

In one or more embodiments, at least one polyhedral cell is refined prior to selecting the plurality of the cell-to-cell interfaces adjacent to the fracture to form the continuous interfaces path approximating the geometry of the fracture. In one or more embodiments, at least one polyhedral cell is refined using adaptive grid refinement techniques. In one or more embodiments, at least one polyhedral cell is refined using a proximity function. In one or more embodiments, the proximity function determines a distance between each polyhedral cell and a feature adjacent to each polyhedral cell such as a fracture, an injection well, or a producing well. In one or more embodiments, the polyhedral cells are tetrahedra that have a longest edge and an edge opposite of the longest edge. At least one tetrahedra is refined by bisecting the tetrahedra with a planar cut extending between the midpoint of longest edge and the edge opposite of the longest edge.

In one or more embodiments, two or more of the polyhedral cells are merged prior to outputting the grid.

In one or more embodiments, the location of a node is optimized.

In one or more embodiments, the simulation model is constructed by performing discretization of governing equations on the output grid and the simulation model is simulated with a reservoir simulator to visually display fluid flow within the fractured subsurface reservoir.

In one or more embodiments, the predetermined fracture properties define fracture-fracture, fracture-matrix, and matrix-matrix connections within the grid.

Another aspect of the present invention, includes a system for generating a grid that can be used to construct a simulation model of a fractured subsurface reservoir. The system includes a user control interface, a database, a computer processor, and a software program. The user control interface is utilized to input information into the system, such as the representation of the fractured subsurface reservoir. The database stores information for the system, such as the representation of the fractured subsurface reservoir input by the user control interface. The processor executes operations for the system. The software program includes a plurality of modules, including a decomposition module and an interface selection module. The decomposition model decomposes the representation of the fractured subsurface reservoir into polyhedral cells defining cell-to-cell interfaces at the boundaries between the polyhedral cells. The interface selection module selects interfaces adjacent to the fracture to form a continuous interfaces path that approximates the fracture represented within the fractured subsurface reservoir. The continuous interfaces path is associated with predetermined fracture properties. A grid having the continuous interfaces path associated with the predetermined fracture properties is output for constructing a simulation model of the fractured subsurface reservoir.

In one or more embodiments, the software program includes a refining module for adaptively refining at least one polyhedral cell using a proximity function.

In one or more embodiments, the software program includes a merging module for merging two or more polyhedral cells.

In one or more embodiments, the software program includes a grid adjustment module for optimizing the location of nodes within the grid.

In one or more embodiments, the interface selection module selects interfaces adjacent to a well to form an interfaces well region approximating the geometry of the well.

Another aspect of the present invention includes a software program stored on a processor readable medium for generating a grid that can be used to construct a simulation model of a fractured subsurface reservoir. The software program is configured for constructing a grid having a plurality of polyhedral cells defining cell-to-cell interfaces at the boundaries of the polyhedral cells and selecting interfaces adjacent to the fracture to form a continuous interfaces path that approximates the geometry of a fracture. The continuous interfaces path is associated with predetermined fracture properties. A grid having the continuous interfaces path associated with the predetermined fracture properties is output for constructing a simulation model of the fractured subsurface reservoir.

BRIEF DESCRIPTION OF THE DRAWINGS

FIG. 6A is a schematic view of a domain of a fractured subsurface reservoir, in accordance with the present invention.

FIG. 6B is a schematic view of interfaces of polyhedral cells approximating the fractures of the domain illustrated in FIG. 6A, in accordance with the present invention.

FIG. 9A is a schematic view of a domain where interfaces of polyhedral cells approximate the discrete fractures, in accordance with the present invention.

FIG. 9B is a schematic view of a grid for the domain illustrated in FIG. 9A, in accordance with the present invention.

DETAILED DESCRIPTION OF THE INVENTION

A significant portion of global petroleum resources reside in fractured subsurface reservoirs. In order to optimally extract these hydrocarbon resources, various techniques related to reservoir simulation must be utilized, such as reservoir gridding. For example, reservoir gridding systems and methods, including aspects of the present invention, can be utilized in various reservoir simulation workflows.

Figure 1:
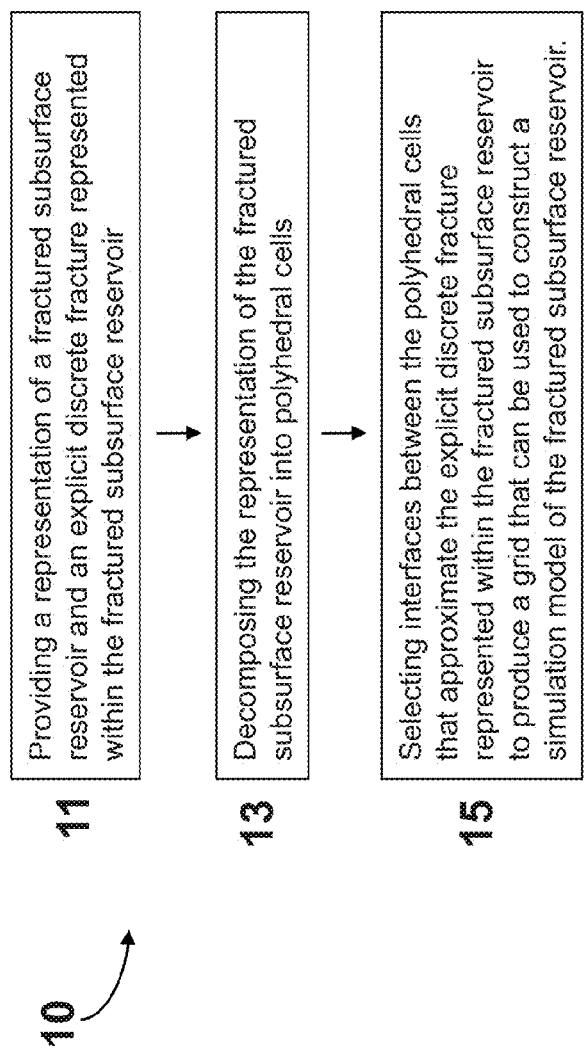
FIG. 1 is a flowchart illustrating steps of a method for generating a grid that can be used to construct a simulation model of a fractured subsurface reservoir, in accordance with the present invention.

FIG. 1 illustrates method 10 outlining steps related to reservoir gridding, according to aspects of the present invention. In particular, steps are employed to generate a grid that can be used to construct a simulation model of a fractured subsurface reservoir. The simulation model can represent the entire fractured subsurface reservoir or a particular portion of the fractured subsurface reservoir. A representation of a fractured subsurface reservoir and an explicit discrete fracture represented within the fractured subsurface reservoir are provided in Step 11. The representation can represent the entire fractured subsurface reservoir or a particular portion of the fractured subsurface reservoir. The representation of the fractured subsurface reservoir is decomposed into polyhedral cells in Step 13 such that a grid of polyhedral cells is created. For example, the fractured subsurface reservoir can be decomposed into a uniform, structured tetrahedral lattice. Cell-to-cell interfaces are defined at boundaries between the polyhedral cells, and in Step 15, the interfaces between the polyhedral cells are selected that approximate the explicit discrete fracture represented within the fractured subsurface reservoir. In particular, cell-to-cell interfaces adjacent to the fracture are selected to form a continuous interfaces path that approximates the geometry of the fracture. As used herein, adjacent shall mean lying near or in close proximity to the fracture, and includes both cell-to-cell interfaces adjoining or intersecting the fracture, as well as, those that do not intersect the fracture and are a boundary or a polyhedral cell or neighboring polyhedral cell in which the fracture traverses. Thus the produced grid, which includes the fracture approximation, is associated with predetermined fracture properties such that the grid defines fracture-fracture, fracture-matrix, and matrix-matrix connections amongst the grid cells. The produced grid, which includes the approximation of the fracture defined by the polyhedral cell interfaces, can be used to construct a simulation model of the fractured subsurface reservoir.

Figure 2:
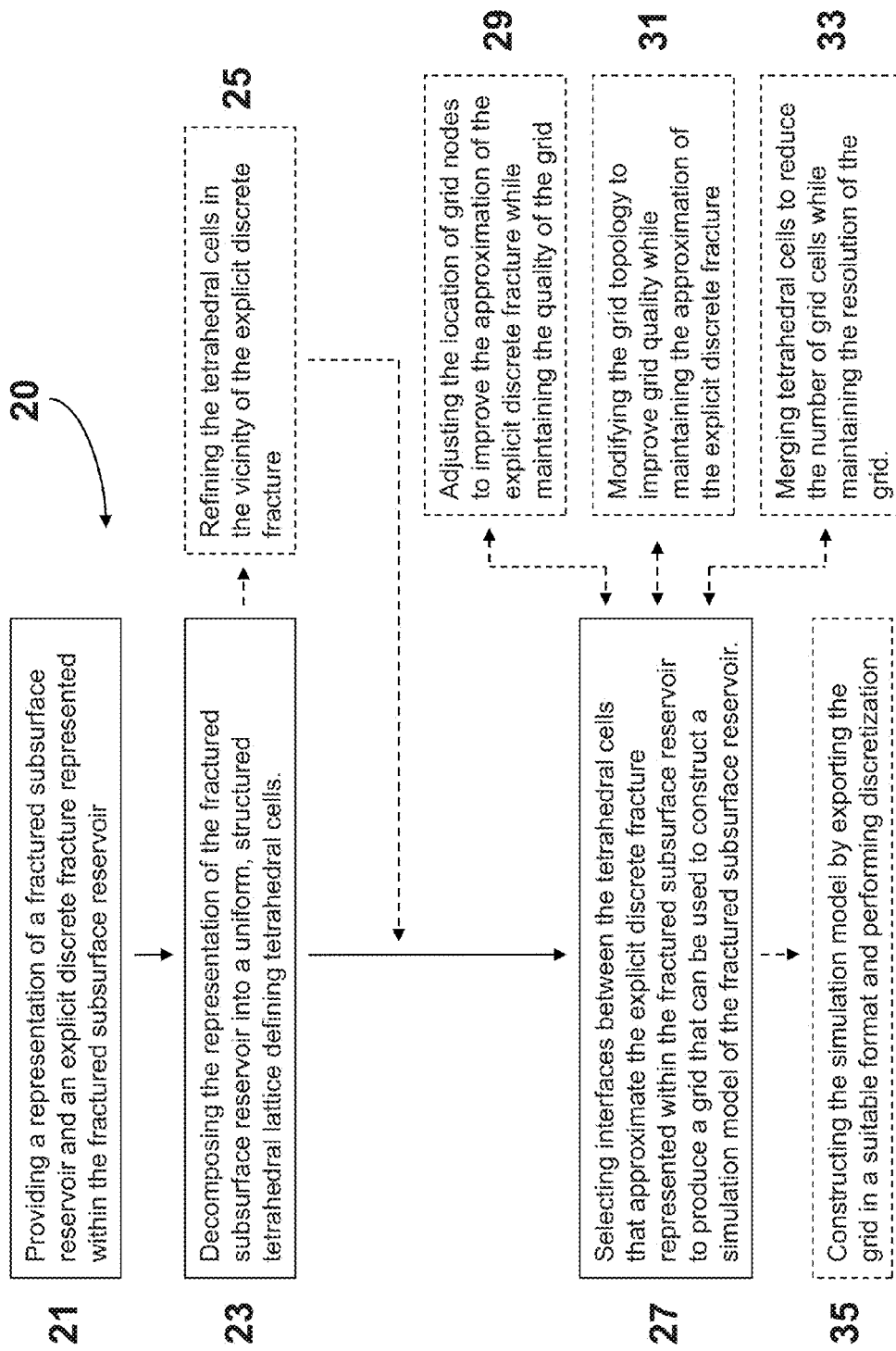
FIG. 2 is a flowchart illustrating steps of a method for generating a grid that can be used to construct a simulation model of a fractured subsurface reservoir, in accordance with the present invention.

FIG. 2 illustrates method 20 outlining steps related 40 reservoir gridding, according to aspects of the present invention. In particular, FIG. 2 depicts optional steps shown in dotted line that can be employed to generate a grid, according to aspects of the present invention. A representation of a fractured subsurface reservoir and an explicit discrete fracture represented within the fractured subsurface reservoir are provided in Step 21. The representation can represent the entire fractured subsurface reservoir or a particular portion of the fractured subsurface reservoir. The representation of the fractured subsurface reservoir is decomposed into a uniform, structured tetrahedral lattice defining tetrahedral cells in Step 23. In step 25, the tetrahedral cells are optionally refined in the vicinity of or adjacent to the explicit discrete fracture. One skilled in the art will appreciate that tetrahedral cells surrounding or adjacent to other internal features of the fractured subsurface reservoir, such as injection and production wells, can also be relined, which will be described in more detail later herein. In Step 27, interfaces between the tetrahedral cells are selected that approximate the explicit discrete fracture represented within the fractured subsurface reservoir to produce a grid that can be used to construct a simulation model of the fractured subsurface reservoir. Both methods 10, 20 can be referred to as a lower-dimensional treatment of fractures.

A number of steps can optionally be performed to improve the quality of the grid, make the grid more suitable for numerical computation, optimize the approximation of the explicit discrete fracture, or a combination thereof. For example, the location of grid nodes can be adjusted in Step 29 to improve the approximation of the explicit discrete fracture while maintaining the quality of the grid. In Step 31, the grid topology can be modified to improve grid quality while maintaining the approximation of the explicit discrete fracture. Various techniques known in the art, such as performing edge flips, can be used in Step 31. Tetrahedral cells can be merged in Step 33 to reduce the number of grid cells while maintaining the resolution of the grid. For example, tetrahedral cells can be merged to form rectangular pyramids, triangular prisms and hexahedra. The generated grid can be exported in a suitable format for performing discretization of the governing equations to construct a simulation model in Step 35.

Figure 3:
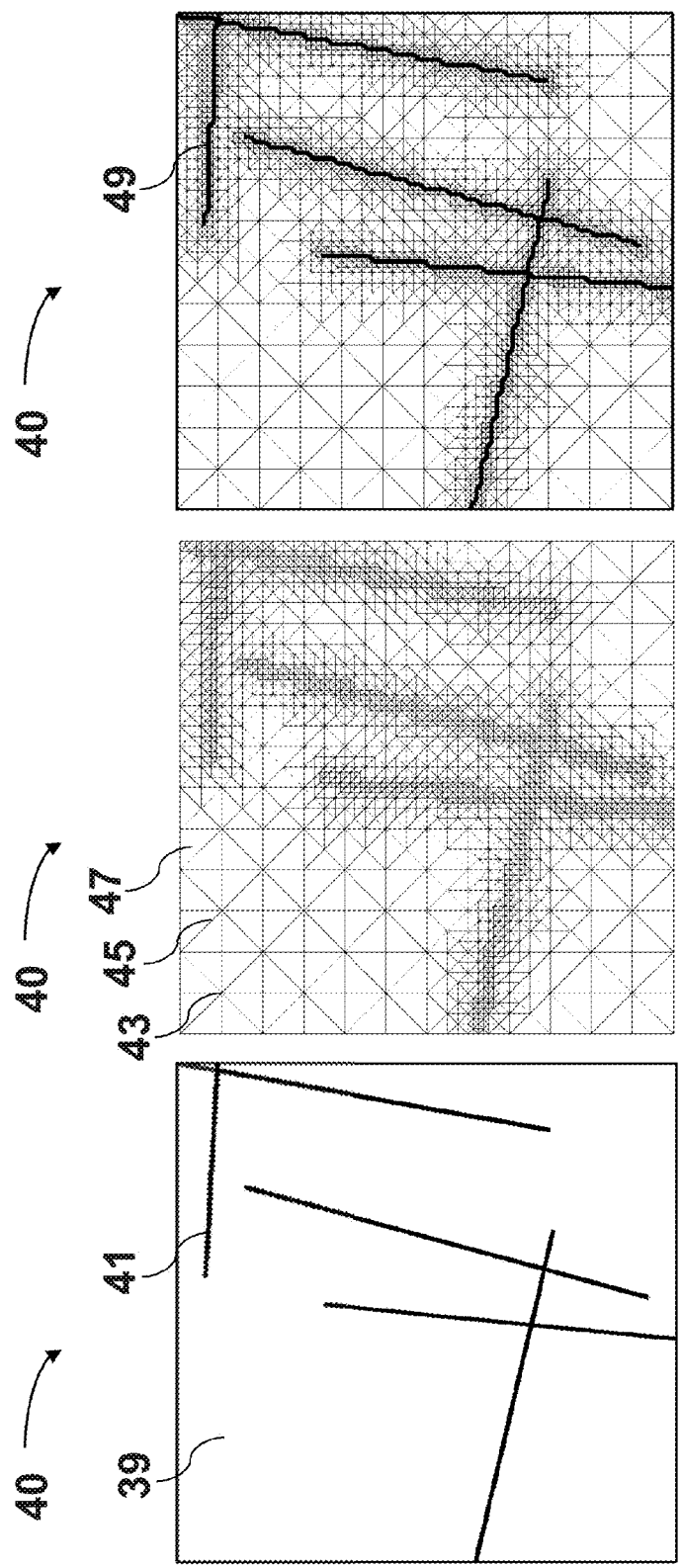
FIGS. 3A-C are schematic diagrams of a domain illustrating steps of the methods shown in FIGS. 1 and 2 for generating a grid that can be used to construct a simulation model of a fractured subsurface reservoir, in accordance with the present invention.

FIGS. 3A-C illustrate a map view of domain 40 illustrating steps of the methods shown in FIGS. 1 and 2 for generating grids that can be used to construct simulation models of a fractured subsurface reservoir, according to aspects of the present invention. The domain 40 of the fractured subsurface reservoir is depicted in FIG. 3A and illustrates the representation of the fractured subsurface reservoir 39 and explicit discrete fractures 41. In particular, such a representation of the fractured subsurface reservoir 39 and the explicit discrete fractures 41 are provided for in Step 11 of method 10 and Step 21 of method 20. The domain 40 of the fractured subsurface reservoir is decomposed with polyhedral cells in Step 13 of method 10 and Step 23 of method 20, as shown FIG. 3B. In FIG. 3B, the polyhedral cells are refined in the vicinity of explicit discrete fractures 41 to improve the resolution near explicit discrete fractures 41 as provided for in Step 25 of method 20. Grid nodes 43, cell interfaces 45, and polyhedral cells 47 are each indicated by reference characters in FIG. 3B. Grid nodes 43 are a vertex shared by two or more polyhedral cells 47 and cell interfaces 45 are cell edges or faces shared by two or more polyhedral cells 47. In Step 15 of method 10 and Step 27 of method 20, interfaces between the polyhedral cells 47 are selected that approximate the explicit discrete fractures 41 represented within the fractured subsurface reservoir to produce a grid that can be used to construct a simulation model of the fractured subsurface reservoir. FIG. 3C shows the polyhedral cell interfaces 49 that approximate the explicit discrete fractures 41 represented within the fractured subsurface reservoir.

The representation provided in Step 11 of method 10 and Step 21 of method 20 defines a domain including the representation of the fractured subsurface reservoir 39 and explicit discrete fractures 41 represented within the fractured subsurface reservoir. For example, these steps typically include a domain that represents a rock matrix, as well as, a fracture representation describing a network of fractures. The fracture representation, which is typically stochastically generated, can be imported into a geological model to construct a more realistic characterization of the fractured subsurface reservoir. The geological model typically includes a structural and stratigraphic framework of the reservoir populated with rock properties such as permeability and porosity distributions, as well as, fluid properties such as initial fluid saturation distributions. These properties or parameters can be obtained from various sources including seismic images, cores, production logs, down-hole well measurements, drilling information, and outcrops.

There are many commercially available products for constructing geological models or representations, such as Earth Decision Suite (powered by GOCAD™) distributed by Paradigm Geotechnology BV headquartered in Amsterdam, The Netherlands and Petrel™ from Schlumberger Limited headquartered in Houston, Tex. There are also many commercially available products for constructing fracture representations, such as FracMan™ distributed by Golder Associates Inc. headquartered in Atlanta, Ga. One skilled in the art will appreciate that multiple realizations of the same geology can be made, leading to similar, yet different reservoir models each being shaped by quasi-random variations. These differences between realizations of reservoir models are inherent as only a certain amount of deterministic information can be extracted from the subsurface reservoir, and one typically relies on applying probabilistic methods in combination with the obtained geological data to construct a realistic reservoir model.

Once the representation of the fractured subsurface reservoir 39 and the explicit discrete fractures 41 are provided, the domain is decomposed into polyhedral cells 47 in Step 13 of method 10 and Step 23 of method 20, such as a uniform, structured tetrahedral lattice. Decomposition of the continuous reservoir model produces a mesh or grid defining specific control volumes within the model that can be subsequently discretized. The domain of the fractured subsurface reservoir can be decomposed with various cell sizes and shapes and is typically gridded at a resolution that can sufficiently capture the fine-scale detail needed to construct a simulation model. One skilled in the all will appreciate that the step of decomposition is performed in a manner such that the polyhedral cells can easily be refined or merged in subsequent steps. In addition, the resulting grid is implemented such that it can be discretized by methods currently practiced in the art, such as finite-volume discretization. Additionally, the grid generated can cover a particular portion of the fractured subsurface reservoir or the entire fractured subsurface reservoir depending on the domain to be studied.

In Step 15 of method 10 and Step 27 of method 20, interfaces between the polyhedral cells that approximate the explicit discrete fracture represented within the fractured subsurface reservoir are selected to produce a grid that can be used to construct a simulation model of the fractured subsurface reservoir. The interfaces are typically planar or nearly planar; however, in some instances the interfaces can be non-planar. To select the interfaces of the polyhedral cells that best approximate the fractures, an objective function is used. For example, the objective function can determine the polyhedral cells that are in closest proximity to a fracture such that the fracture geometry can be approximated by interfaces between those polyhedral cells. One skilled in the art will appreciate that different criteria can be used as input to the objective function. For example, the input might only allow one edge from a polyhedral cell to be used to define the fracture's geometry, only allow a predetermined range for the angle of incidence between two adjacent edges of polyhedral cells that are selected to define the fracture's geometry, select the edges of the polyhedral cells based on a weighted shortest path between the nodes closest to the ends of each fracture, or a combination thereof. Furthermore, proximity can be determined by the Euclidean distance between a fracture and an interlace or can also be determined by a non-metric or non-Euclidean form of measurement. In some instances, all horizontal slices through a fracture can be preprocessed to find an exemplary horizontal slice that contains the interfaces between the polyhedral cells that best approximate the fracture's geometry. The interfaces between the polyhedral cells in the exemplary horizontal slice can be propagated vertically to define the fracture as a planar rectangular structure within the horizontal layers. In addition, the domain of the fractured subsurface reservoir can include one or more wells, such as injection or production wells, and the wells can similarly be approximated by interfaces of the polyhedral cells.

Once the grid is generated for the fractured subsurface reservoir, it can be discretized and simulation of fluid flow within the reservoir can be performed using a reservoir simulator. There are many commercial products used for performing reservoir simulations, such as Chevron's proprietary CHEARS™ simulation package or Schlumberger's ECLIPSE™ reservoir simulator. Additionally. INTERSECT™, which is commonly owned by Chevron and Schlumberger, is another proprietary reservoir simulation package that can be used to simulate fluid flow within a reservoir.

Grid generation for the fractured subsurface reservoir is preferably substantially automated. In addition, grid resolution can be spatially adaptive. For example, refined cells can be used in the vicinity of fractures and wells, while larger polyhedral cells can be utilized elsewhere for efficiency. If the cells are tetrahedral-shaped, such that they have a longest edge and an edge opposite of the longest edge, then refinement can be performed by bisecting the tetrahedral cell with a planar cut extending between the midpoint of longest edge and the edge opposite of the longest edge.

Figure 4:
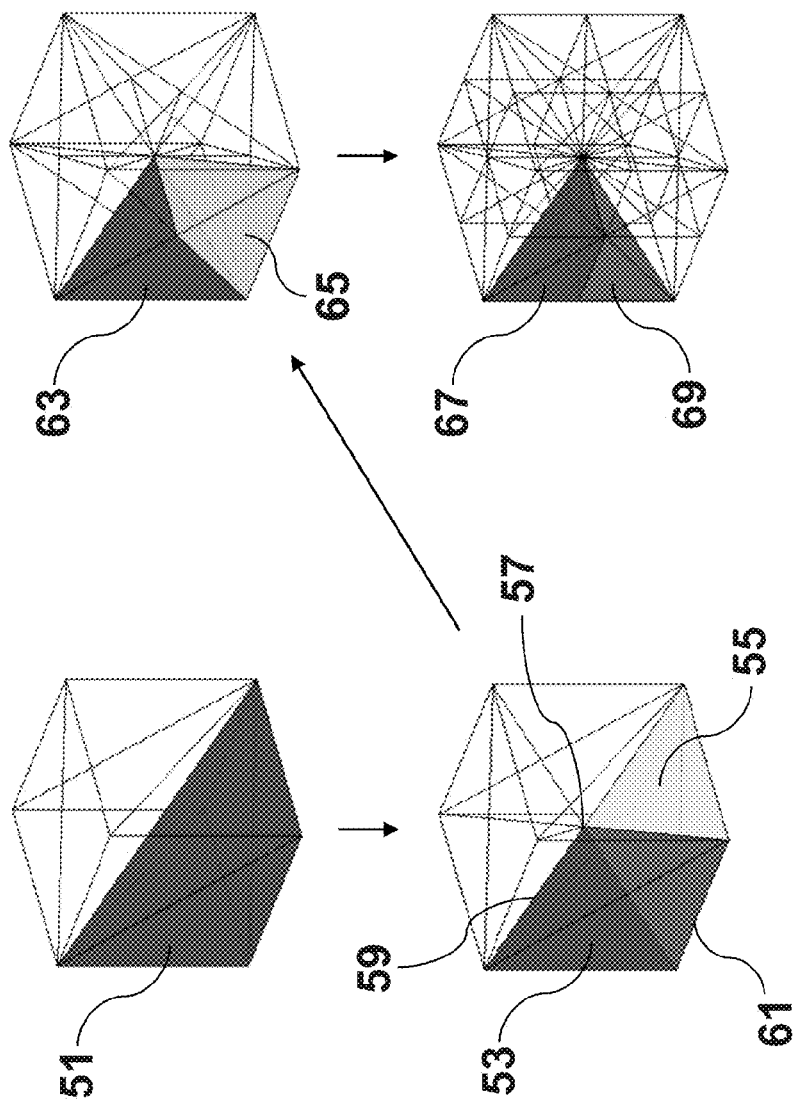
FIG. 4 is a schematic diagram illustrating a series of refinements for a tetrahedron, in accordance with the present invention.

FIG. 4 depicts a series of refinements for a tetrahedron, which as illustrated can be described as a cell of an overlying uniform grid defining six tetrahedral cells per cube. As illustrated, tetrahedron 51 can be refined into tetrahedron 53 and tetrahedron 55 by bisecting tetrahedron 51 with a planar cut extending between the midpoint 57 of longest edge 59 and the edge opposite 61 of the longest edge 59. Similarly, tetrahedron 53 can further be refined into tetrahedron 63 and tetrahedron 65 using this "longest edge" refinement technique. Tetrahedron 63 can further be refined into tetrahedron 67 and tetrahedron 69.

One skilled in the art will appreciate that refinement can continue until the polyhedral cells near the fracture or well have been refined a predetermined amount. Furthermore, two or more polyhedral cells can be merged to form a larger polyhedral cell to reduce the number of grid cells prior to constructing the simulation model of the fractured subsurface reservoir. In some embodiments, the grid generation system and method can be adjusted using a single input parameter to obtain a suitable compromise between grid cell quality and the approximation of the fracture representation. The grid generation system and method, according to aspects of the present invention, also do not require preprocessing of the fracture sets or the explicit calculation of fracture intersections.

Figure 5:
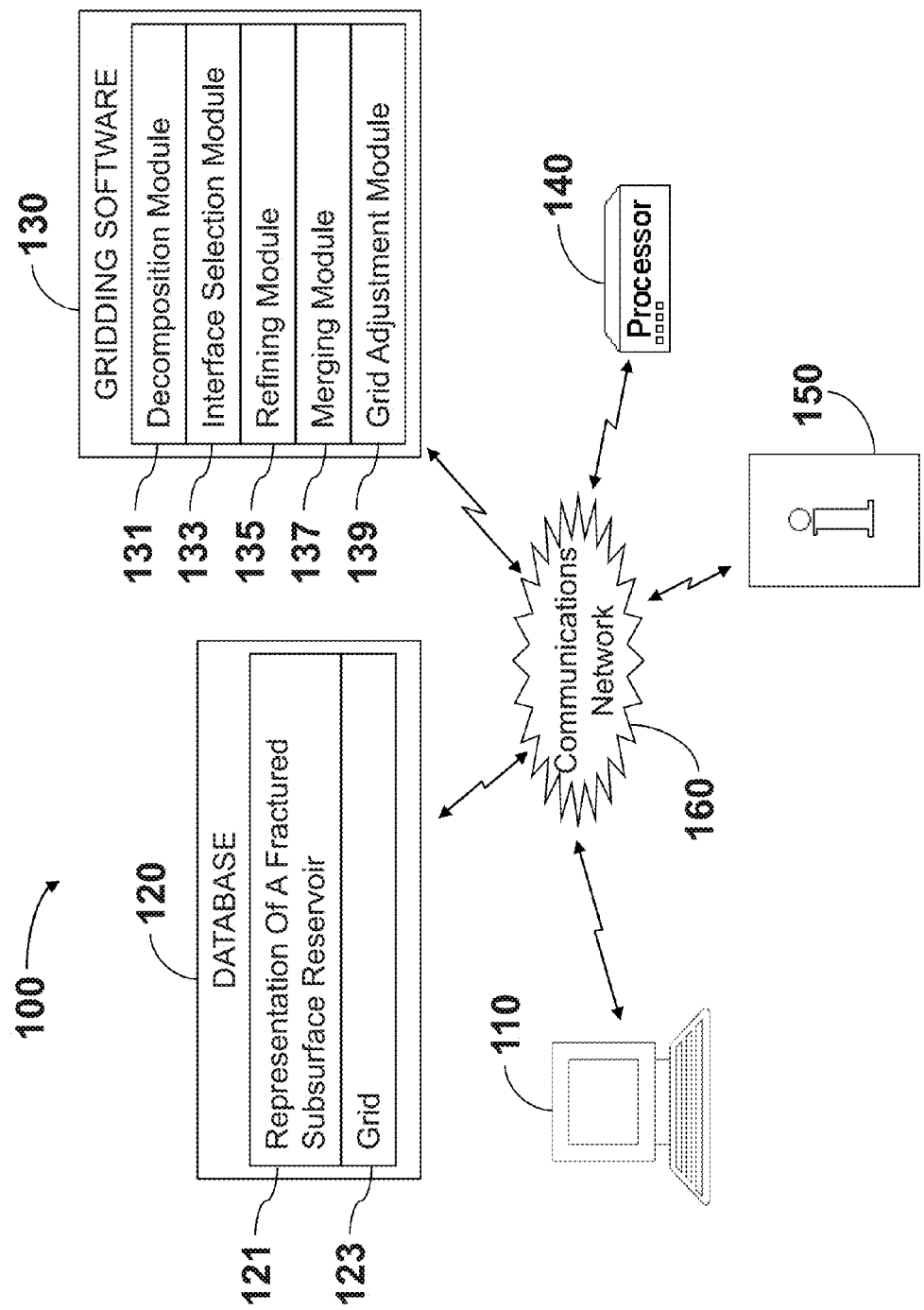
FIG. 5 is a schematic diagram illustrating a system for generating a grid that can be used to construct a simulation model of a fractured subsurface reservoir, in accordance with the present invention.

FIG. 5 illustrates a system 100 by which a grid is generated for a fractured subsurface reservoir, according to aspects of the present invention. System 100 includes user interface 110, such that an operator can actively input information and review operations of system 100. User interface 110 can be any means in which a person is capable of interacting with system 100 such as a keyboard, mouse, touch-screen display, or a handheld graphic user interface (GUI) including a personal digital assistant (PDA). Input that is entered into system 100 through user interface 110 can be stored in a database 120. Additionally, information generated by system 100 can also be stored in database 120. For example, database 120 can store a representation of a fractured subsurface reservoir 121, as well as, system generated information such as grid 113.

System 100 includes gridding software 130 to perform a plurality of operations. As will be discussed in more detail herein, gridding software 130 contains a decomposition module 131, interface selection module 133, refining module 135, merging module 137, and grid adjustment module 139. One skilled in the art will appreciate that for operation of system 100, all of these modules are nut required. For instance, in some cases gridding software 130 may only utilize decomposition module 131 and interface selection module 133 to generate a grid. Processor 140 interprets instructions to execute operations for system 100, as well as, generate automatic instructions to execute gridding software 130 responsive to predetermined conditions. Instructions from both user interface 110 and gridding software 130 are processed by processor 140 for operation of system 100.

In certain embodiments, system 100 can include reporting unit 150 to provide information to the operator or to other systems (not shown). For example, reporting unit 150 can be a printer, display screen, or a data storage device. However, it should be understood that system 100 need not include reporting unit 150, and alternatively user interface 110 can be utilized for reporting information of system 100 to the operator. For example, the output can be visually displayed to the user using a monitor or user interface device such as a hand-held graphic user interface (GUI) including a personal digital assistant (PDA).

Communication between any components of system 100, such as user interface 110, database 120, gridding software 130, processor 140 and reporting unit 150 are preferably transferred over communications network 160. Communications network 160 can be any means that allows for information transfer. Examples of such a communications network 160 presently include, but are not limited to, a switch within a computer, a personal area network (PAN), a local area network (LAN), a wide area network (WAN), and a global area network (GAN). Communications network 160 can also include any hardware technology used to connect the individual devices in the network, such as an optical cable or wireless radio frequency.

In operation of system 100, an operator inputs data, such as the representation of the fractured subsurface reservoir 121 that describes a fractured subsurface reservoir, through user interface 110 such that it is stored in database 120. Gridding software 130 is then initiated to generate a grid 123 for the simulation model. Gridding software 130 decomposes the representation of the fractured subsurface reservoir 121 with polyhedral cells using decomposition module 131. Gridding software 130 selects interfaces between the polyhedral cells that approximate the explicit discrete fracture represented within the fractured subsurface reservoir to produce a grid that can be used to construct a simulation model of the fractured subsurface reservoir using interface selection module 133.

Refining module 135, merging module 137, and grid adjustment module 139 can be used to obtain a more suitable compromise between grid cell quality and the approximation of the fracture representation. Relining module 135 is capable of relining polyhedral cells in the vicinity of fractures and wells such that the interface selection module 133 can better approximate the geometry of the fractures and wells with the interfaces of the polyhedral cells. Merging module 137 can combine two or more polyhedral cells to improve the efficiency of the grid by reducing the amount numerical computation needed to simulate the model. Grid adjustment module 139 is capable of optimizing the approximation of the fractures or wells, while balancing the quality and efficiency of the grid. For example, grid adjustment module 139 can sweep through nodes within the grid and move them to better approximate the geometry of the fractures and wells. Movement of a node describing a fracture or well can be responsive to a penalty function to ensure that moving the node does not negatively affect the quality of the grid by a large amount. For example, if grid adjustment module 139 determines that node should be moved to improve the approximation of the fracture, the penalty function is able to constrain the movement of the node based on the negative impact to the quality of the grid. Other nearby nodes can also be moved in order to improve the quality of grid surrounding the newly adjusted polyhedral cell, thus spreading the deformation out over a larger region. Grid adjustment module 139 can also modify the grid topology to improve grid quality while maintaining the approximation of the explicit discrete fracture. For example, grid adjustment module 139 can perform edge flips to alter a worst incident polyhedral cell.

EXAMPLES

FIG. 6A is an example that illustrates domain 200 depicting a fractured subsurface reservoir having two horizontal layers (not shown) and fracture representation 201. Domain 200 contains 40 discrete fractures 203 that are represented by 2D polygons. In this example, the fractures within fracture representation 201 are represented as planar rectangles extending within the horizontal layers. Fractures penetrating through both horizontal layers of domain 200 extend from the bottom of domain 200 to the top of domain 200. Fracture 205 represents a fracture bound by the top horizontal layer, fracture 207 represents a fracture bound by the bottom horizontal layer, and fracture 209 penetrates through both horizontal layers such that it extends from the bottom of domain 200 to the top of domain 200. Domain 200 is an example of a domain that can be provided in Step 11 of method 10 and Step 21 of method 20.

FIG. 6B shows the interfaces of the polyhedral cells 211 that were selected to approximate fracture representation 201 of domain 200, according to aspects of the present invention. In particular, the domain 200 was decomposed with tetrahedral cells, similar to that which was performed in Step 13 of method 10 and Step 23 of method 20. The discrete fractures were approximated by the interfaces between tetrahedral cells as performed in Step 15 of method 10 and Step 27 of method 20. Grid adjustment, as described in Steps 29 and 31 of method 20, has also been performed for the grid to improve the quality of the approximation to the fractures. The interfaces or edges of the tetrahedral cells depict a portion of a grid that can be used to construct a simulation model of the fractured subsurface reservoir.

Figure 7B:
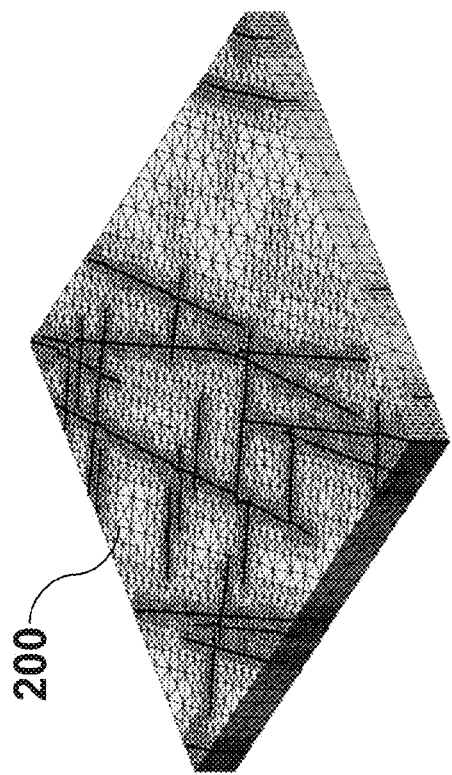
FIGS. 7A & 7B are schematic views of grids at various resolution for the domain illustrated in FIG. 6A.
Figure 7A:
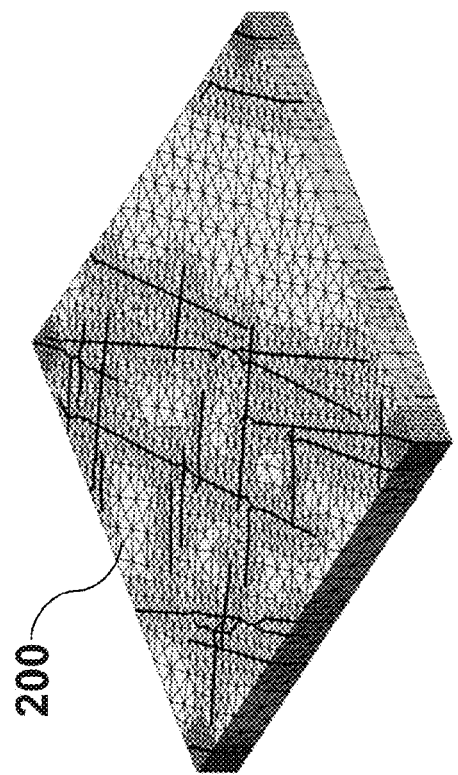

One skilled in the art will appreciate that grids of various resolutions can be generated to obtain a suitable compromise between number of cells, grid cell quality and the approximation of the fracture representation. For example, FIG. 7 shows a comparison of constructing grids for domain 200 using various resolutions. In particular, FIG. 7A is generated using approximately 54,000 tetrahedral cells, while FIG. 7B is generated using approximately 209,000 tetrahedral cells. Grid adjustment, as described in Steps 29 and 31 of method 20, has been performed for the grids shown in FIGS. 7A and 7B to improve the quality of the approximation to the fractures.

Figure 8C:
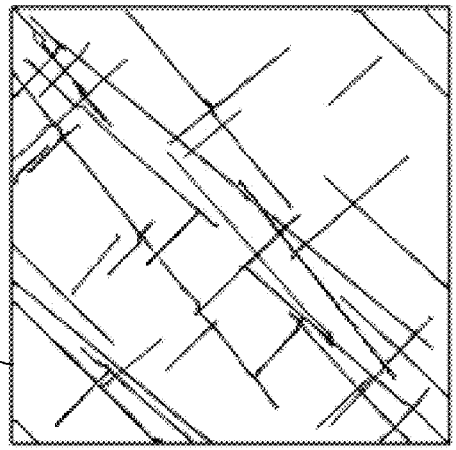
FIG. 8C is a map view of the grid shown in FIG. 7B.
Figure 8B:
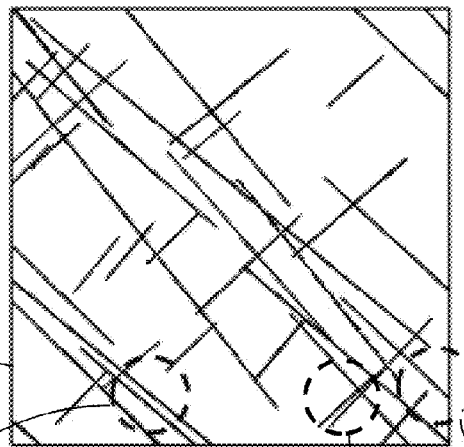
FIG. 8B is a map view of the grid shown in FIG. 6A.
Figure 8A:
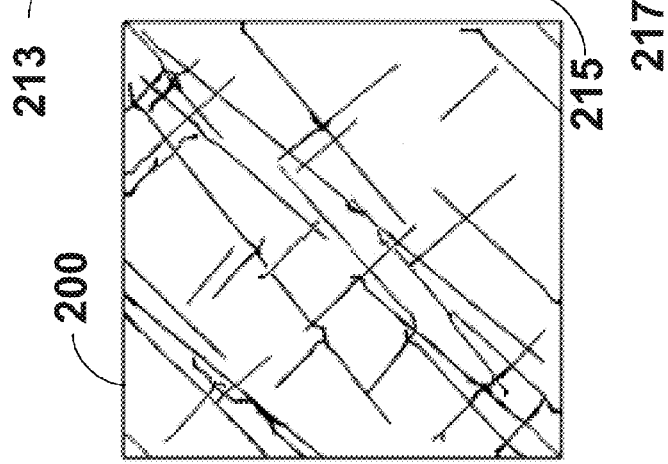
FIG. 8A is a map view of the grid shown in FIG. 7A.

FIG. 8 compares the grids generated at the resolutions of FIGS. 7A and 7B by depicting map views of the grids that illustrate the tetrahedral cells that were selected to approximate the fractures. In particular, FIG. 8A depicts a map view of the grid shown in FIG. 7A where the grid was generated using approximately 54,000 tetrahedral cells, while FIG. 8C depicts a map view of the grid shown in FIG. 7B where the grid was generated using approximately 209,000 tetrahedral cells. The representation of the fracture characterization, which is depicted in FIG. 6A, is shown in map view in FIG. 8B as a reference to highlight differences with regards to how fractures were approximated by the tetrahedral cells in each grid at different resolutions. Areas 213, 215 and 217 highlight how the finer resolution of FIG. 8C is able to better capture certain geometric intricacies, such as two fractures being close to one another without intersecting (213), two fractures intersecting with a small dihedral angle (215), or one fracture almost penetrating the plane of another fracture (217).

FIG. 9 depicts a large simulation model of a fractured subsurface reservoir in which a grid was generated, according to aspects of the present invention. In particular, the simulation model encompasses a region that is approximately 17 mi×1.4 mi×1.1 mi in physical dimension and contains 1021 discrete fractures. The internal volume of the simulation model was decomposed into tetrahedral cells, with the finest tetrahedral cells having a 60 meter resolution. The tetrahedral cells were relined using adaptive grid refinement techniques. In particular, the tetrahedral cells were refined by bisecting the cells with a planar cut extending between the midpoint of its longest edge and the edge opposite of the longest edge. The fractures were approximated by the tetrahedral cells such that they are represented by the triangular interfaces of the tetrahedral cells. In particular, the fractures were approximated by 70,000 triangular interfaces or edges, which are shown in FIG. 9A. The interfaces of the cells depict a portion of a grid of the fractured subsurface reservoir. A portion of the exterior of the grid is also shown in FIG. 9A. The remaining exterior portion of the grid is shown in FIG. 9B. The entire grid is decomposed into approximately one million tetrahedral cells.

Figure 10:
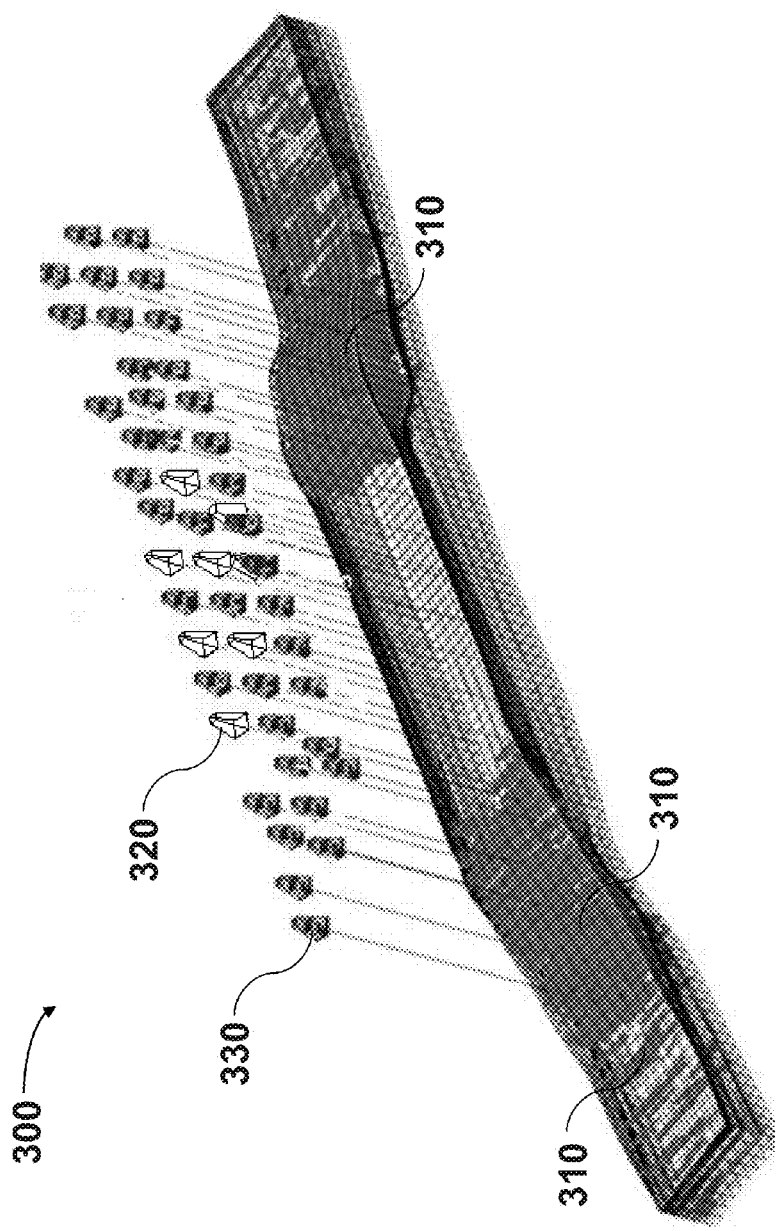
FIG. 10 is a schematic view of a domain of a fractured subsurface reservoir including production and injection wells, in accordance with the present invention.

FIG. 10 depicts another representation of the large simulation model shown in FIG. 9 in which another grid was generated, according to aspects of the present invention. The simulation model 300 contains 1230 discrete fractures, represented by reference character 310, and 47 current or future planned wells (8 fluid injection wells 320 and 39 producing wells 330).

Figure 11:
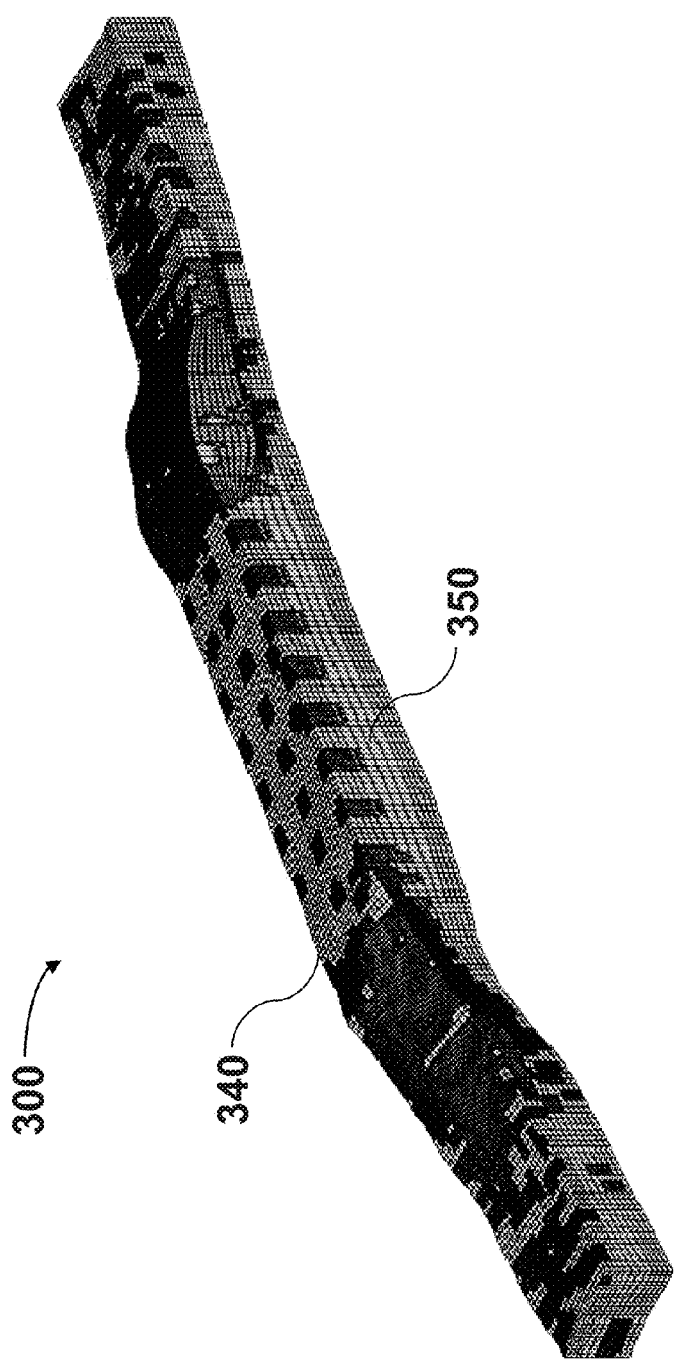
FIG. 11 is a schematic view of a grid for the domain illustrated in FIG. 10, in accordance with the present invention.

Referring to FIG. 11, the gridding technique shown in FIGS. 1 and 2 was employed to create a high-quality grid with adaptive spatial resolution that conforms to the discrete fractures 310 and wells 320, 330. To reduce the number of grid cells, while maintaining the resolution of the grid, polyhedral cells were merged as described in Step 33 of method 20. The grid 340 decomposes the model 300 into 197,802 nodes and 344,805 fine-scale polyhedral cells 350 to capture the detail around the network of fractures and the wells. In particular, 305,751 matrix and 39,054 fracture control volumes define 893,987 flow connections that can be used to simulate the model in a reservoir simulator. While FIGS. 9-11 perform the gridding techniques disclosed in FIGS. 1 and 2 to construct a large simulation model, one skilled in the art will appreciate that these techniques can be applied to a subsurface reservoir of various scales, including a section of these larger subsurface reservoirs.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A computer-implemented method for generating a grid used to construct a simulation model of a fractured subsurface reservoir, the method comprising:
   providing a representation of a fractured subsurface reservoir, a network of fractures represented within the fractured subsurface reservoir, a rock matrix represented within the fractured subsurface reservoir, and a geometry of each of the fractures;
   constructing a uniform, structured lattice comprising a plurality of polyhedral cells representing the rock matrix, the polyhedral cells having cell-to-cell interfaces in between the polyhedral cells;
   refining a portion of the polyhedral cells representing the rock matrix of the uniform, structured lattice, wherein the polyhedral cells being refined are in vicinity of the network of fractures, and wherein refining occurs after constructing;
   selecting, for each of the fractures, a plurality of the cell-to-cell interfaces in between the polyhedral cells representing the rock matrix and that are adjacent to the fracture to form a continuous interfaces path approximating the geometry of the fracture, wherein selecting occurs after refining;
   associating each of the continuous interfaces paths formed with predetermined fracture properties, wherein associating occurs after selecting; and
   outputting a grid comprising each of the continuous interfaces paths associated with the predetermined fracture properties for use in constructing a simulation model of the fractured subsurface reservoir.

2. The method of claim 1, further comprising:
   providing a well and a geometry of the well;
   selecting a plurality of the cell-to-cell interfaces adjacent to the well to form an interfaces well region approximating the geometry of the well; and
   associating the interfaces well region with predetermined well properties such that the grid output comprises the interfaces well region associated with the predetermined well properties.

3. The method of claim 1, wherein:
   the polyhedral cells are tetrahedra, the tetrahedra each having a longest edge and an edge opposite of the longest edge; and
   the refining comprises bisecting the tetrahedra with a planar cut extending between the midpoint of the longest edge and the edge opposite of the longest edge.

4. The method of claim 1, wherein:
   the refining comprises using adaptive grid refinement techniques.

5. The method of claim 1, further comprising:
   refining such that a proximity function determines a distance between each of the polyhedral cells and a well in vicinity of each of the polyhedral cells, the well selected from a group consisting of an injection well and a producing well.

6. The method of claim 1, further comprising:
   merging two or more of the polyhedral cells prior to outputting the grid.

7. The method of claim 1, further comprising:
   identifying a location of a node, the node being characterized by a vertex shared by two or more polyhedral cells; and
   optimizing the location of the node prior to outputting the grid.

8. The method of claim 1, wherein:
   the polyhedral cells of the uniform, structured lattice are tetrahedra.

9. The method of claim 1, wherein:
   the simulation model is constructed by performing discretization of governing equations on the grid output; and
   the simulation model is simulated with a reservoir simulator to visually display fluid flow within the fractured subsurface reservoir.

10. The method of claim 1, wherein:
    the grid output includes fracture-fracture, fracture-matrix, and matrix-matrix connections within the grid.

11. The method of claim 1, further comprising modifying a grid topology of the grid prior to outputting the grid.

12. The method of claim 1, wherein the polyhedral cells of the uniform, structured lattice are triangular.

13. The method of claim 1, wherein:
the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

14. A system for generating a grid used to construct a simulation model of a fractured subsurface reservoir, the system comprising:
a user interface to input information into the system, the information including a representation of a fractured subsurface reservoir, a network of fractures represented within the fractured subsurface reservoir, a rock matrix represented within the fractured subsurface reservoir, and a geometry of each of the fractures;
a database configured to store data including the input information from the user interface;
a computer processor configured to receive the stored data from the database and to execute a software program responsive to the stored data; and
the software program executable on the computer processor, the software program comprising:
constructing a uniform, structured lattice comprising a plurality of polyhedral cells representing the rock matrix, the polyhedral cells having cell-to-cell interfaces in between the polyhedral cells;
refining a portion of the polyhedral cells representing the rock matrix of the uniform, structured lattice, wherein the polyhedral cells being refined are in vicinity of the network of fractures, and wherein refining occurs after constructing;
selecting, for each of the fractures, a plurality of the cell-to-cell interfaces in between the polyhedral cells representing the rock matrix and that are adjacent to the fracture to form a continuous interfaces path approximating the geometry of the fracture, wherein selecting occurs after refining; and
associating each of the continuous interfaces paths formed with predetermined fracture properties, wherein associating occurs after selecting,
wherein a grid comprising each of the continuous interfaces paths associated with the predetermined fracture properties is output for constructing a simulation model of the fractured subsurface reservoir.

15. The system of claim 14, further comprising:
refining such that a proximity function determines a distance between each of the polyhedral cells and a well in vicinity of each of the polyhedral cells, the well being selected from a group consisting of an injection well and a producing well.

16. The system of claim 14, wherein:
the software program further comprises merging two or more polyhedral cells prior to outputting the grid.

17. The system of claim 14, wherein:
the software program further comprises performing at least one of the following operations selected from the group consisting of optimizing a location of a node prior to outputting the grid and modifying a grid topology of the grid prior to outputting the grid.

18. The system of claim 14, further comprising:
selecting a plurality of the cell-to-cell interfaces to form an interfaces well region approximating a geometry of a well, the interfaces well region being associated with predetermined well properties such that the output grid comprises the interfaces well region associated with the predetermined well properties.

19. The system of claim 14, wherein the polyhedral cells of the uniform, structured lattice are tetrahedra.

20. The system of claim 14, wherein the polyhedral cells of the uniform, structured lattice are triangular.

21. The system of claim 14, wherein:
the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

22. A non-transitory processor readable medium containing computer readable software instructions used to generate a grid for a simulation model of a fractured subsurface reservoir, the software instructions comprising:
constructing a uniform, structured lattice for a representation of a fractured subsurface reservoir having a network of fractures and a rock matrix represented within the fractured subsurface reservoir, the lattice comprising a plurality of polyhedral cells representing the rock matrix, the polyhedral cells having cell-to-cell interfaces in between the polyhedral cells;
refining a portion of the polyhedral cells representing the rock matrix of the uniform, structured lattice, wherein the polyhedral cells being refined are in vicinity of the network of fractures, and wherein refining occurs after constructing;
selecting, for each of the fractures, a plurality of the cell-to-cell interfaces in between the polyhedral cells representing the rock matrix and that are adjacent to the fracture to form a continuous interfaces path approximating a geometry of the fracture, wherein selecting occurs after refining;
associating each of the continuous interfaces paths formed with predetermined fracture properties, wherein associating occurs after selecting; and
outputting a grid comprising each of the continuous interfaces paths associated with the predetermined fracture properties for use in constructing a simulation model of the fractured subsurface reservoir.

23. The non-transitory processor readable medium of claim 22, wherein:
the software instructions further comprise selecting a plurality of the cell-to-cell interfaces to form an interfaces well region approximating a geometry of a well, the interfaces well region being associated with predetermined well properties such that the output grid comprises the interfaces well region associated with the predetermined well properties.

24. The non-transitory processor readable medium of claim 22, wherein:
the software instructions further comprise performing at least one of the following operations selected from the group consisting of (i) refining such that a proximity function determines a distance between each of the polyhedral cells and a well in vicinity of each of the polyhedral cells, the well selected from a group consisting of an injection well and a producing well, (ii) merging two or more polyhedral cells prior to outputting the grid, modifying a grid topology of the grid prior to outputting the grid, and (iv) optimizing a location of a node prior to outputting the grid.

25. The non-transitory processor readable medium of claim 22, wherein the polyhedral cells of the uniform, structured lattice are tetrahedra.

26. The non-transitory processor readable medium of claim 22, wherein the polyhedral cells of the uniform, structured lattice are triangular.

27. The non-transitory processor readable medium of claim 22, wherein:
  the refining the portion of the polyhedral cells representing the rock matrix of the constructed uniform, structured lattice is based on a proximity function, the proximity function determining a distance between each of the polyhedral cells and the fracture in vicinity of each of the polyhedral cells.

* * * * *